United States Patent
Sonoda et al.

(10) Patent No.: US 6,197,270 B1
(45) Date of Patent: *Mar. 6, 2001

(54) PROCESS FOR PRODUCING AEROGEL

(75) Inventors: Kenji Sonoda, Shijonawate; Hiroshi Yokogawa, Hirakata; Masaru Yokoyama, Yao; Kenji Tsubaki, Katano, all of (JP)

(73) Assignee: Matsushita Electric Works, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,080

(22) Filed: Nov. 21, 1997

(30) Foreign Application Priority Data

Dec. 20, 1996 (JP) .................................................. 8-342176
Dec. 24, 1996 (JP) .................................................. 8-343282
Mar. 14, 1997 (JP) .................................................. 9-061435

(51) Int. Cl.$^7$ ............................................... C01B 33/146
(52) U.S. Cl. ........................... 423/338; 502/233; 65/17.2
(58) Field of Search ........................ 252/315.2; 556/442, 556/457, 459; 516/111, 100; 423/325, 338; 502/233; 65/17.2

(56) References Cited

U.S. PATENT DOCUMENTS

| 4,402,927 | 9/1983 | von Dardel et al. ............... 423/335 |
| 4,432,956 | 2/1984 | Zarzycki et al. .................... 423/338 |
| 4,548,705 | * 10/1985 | Young et al. ....................... 502/64 |
| 4,610,863 | 9/1986 | Tewari et al. ...................... 423/338 |
| 5,122,291 | 6/1992 | Wolff et al. ........................ 106/475 |
| 5,137,927 | 8/1992 | Wolff et al. ........................ 521/54 |
| 5,496,527 | 3/1996 | Yokogawa et al. ................ 423/338 |
| 5,647,962 | 7/1997 | Jansen et al. ...................... 423/338 |
| 5,789,075 | * 8/1998 | Frank et al. ........................ 423/325 |

FOREIGN PATENT DOCUMENTS

| 0409083 | 6/1990 | (EP) . |
| 0396076 | 11/1990 | (EP) . |
| 0585456 | 3/1994 | (EP) . |
| 690023 | 1/1996 | (EP) . |
| 585456B1 | 5/1997 | (EP) . |
| 779523 | 6/1997 | (EP) . |
| 721605 | 1/1955 | (GB) . |
| 47-15398 | 8/1972 | (JP) . |
| 2304299 | 12/1990 | (JP) . |
| 5279011 | 10/1993 | (JP) . |
| 7138375 | 5/1995 | (JP) . |
| WO/9506617 | 3/1995 | (WO) . |
| 9606808 | * 3/1996 | (WO) . |
| WO/9622942 | 8/1996 | (WO) . |

OTHER PUBLICATIONS

H. Yokogawa et al., "Hydrophobic silica aerogels", Journal of Non-Crystalline Solids, vol. 186, pp. 23–29, 1995, Amsterdam NL, (No Month).

* cited by examiner

Primary Examiner—Stuart Hendrickson
(74) Attorney, Agent, or Firm—Birch, Stewart, Kolasch & Birch, LLP

(57) ABSTRACT

There is provided a process for producing an aerogel which comprises lowering a pH of a water glass solution to obtain a sol, gelling the sol to obtain a hydrogel, replacing water in the gel with an organic solvent, reacting the gel with a hydrophobilizing agent having hydrophobic groups as well as functional groups reactive with silanol groups in liquid phase, followed by supercritically drying; or hydrophobilizing and supercritically drying the resultant gel at the same time. Preferably, the hydrogel is prepared by ion exchanging alkali metals in the water glass solution using an ion exchange resin to obtain a sol which is subjected to suspension polymerization.

23 Claims, No Drawings

PROCESS FOR PRODUCING AEROGEL

BACKGROUND OF THE INVENTION

1. Field of the Invention

The present invention relates to a process for producing an aerogel. More specifically, the present invention relates to a process for producing a silica aerogel, which has properties such as heat insulating properties peculiar to porous materials. Additional properties of the aerogel include and transparency, as well as excellent hydrophobic nature.

2. Description of the Prior Art

A process for producing an aerogel which is useful as a translucent heat insulator has been disclosed in U.S. Pat. No. 4,402,927, U.S. Pat. No. 4,432,956, and U.S. Pat. No. 4,610,863. These patents disclosed a following process for obtaining an aerogel. That is, hydrolysis and condensation polymerization of alkoxysilane (also named silicon alkoxide or alkyl silicate) are carried out, and then the resulting gel is dried in the presence of a dispersion medium under a supercritical condition over a critical point of the dispersion medium (such a drying method is called supercritical drying), to obtain the aerogel.

In this process, the dispersion medium used in supercritical drying is carbon dioxide or organic solvents such as ethanol and the like. However, in the case of using carbon dioxide as the dispersion medium, since the resulting aerogel retains silanol groups on the surface therefore, it manifests hygroscopicity and therefore adsorbs moisture in the atmosphere. Further, silanol groups having high hydrophilicity are formed on the surface of the aerogel by adsorbed water, which adsorbs more moisture in the atmosphere over time. On the other hand, in the case of using organic solvents such as ethanol and the like as the dispersion medium of supercritical drying, since the resulting aerogel retains alkoxyl groups on the surface, the aerogel retains hydrophobicity immediately after the supercritical drying. But, the alkoxyl groups are hydrolyzed by moisture in the atmosphere over time, so that silanol groups are formed on the surface of the aerogel and, consequently adsorbs moisture in the atmosphere in the same way as the above case.

Therefore, there is a problem that optical properties such as transparency or thermal properties such as heat insulating properties of the aerogel are lowered, and dimensional change or cracks arises from shrinkage caused by moisture adsorption, so that deterioration of quality or performance arises, resulting in lack of practical use.

The present inventors have proposed a process for producing an aerogel, which can prevent properties therefore from deteriorating over time by imparting hydrophobicity thereto, in JPA-HEI 5-279,011 and JPA-HEI 7-138,375. In these processes, alkoxysilane compounds are used as a starting material and an aerogel is produced through the steps of hydropbobilizing treatment and supercritical drying.

However, in a process for producing an aerogel using alkoxysilane, there is the following problem. In the process, where alkoxysilane is hydrolyzed in an organic solvent such as an alcohol with water and a catalyst, the resulting product is condensation-polymerized, and a gel is prepared through a sol state; but, in this case, since organic solvents such as alcohol used as a solvent have relatively high volatility, when the gel obtained is exposed to the air, the organic solvents contained in the gel is volatilized in a short time, so that the resulting aerogel is liable to manifest cracks or shrinkage before supercritical drying. This particularly occurs in the steps of preparation of the sol, gelation and curing of the gel. Therefore, there is a problem that the resulting aerogels obtained after supercritical drying include some off-qualities such as cracks and the like, and the yield of non-detectives thereof becomes lower.

In order to prevent an organic solvent of an alcohol and the like used in the sol or the gel from volatilizing, it is necessary to attain the airtight condition or to fill the atmosphere with the vapor of the same organic solvent from the time point of preparing the sol. Curing the gel is effective for strengthening the gel structure to heat at a range from room temperature to several tens of ° C. However, it is not preferable from a safety viewpoint to heat under the condition of filling the atmosphere with the vapor of an organic solvent.

In view of these circumstances, the present inventors investigated starting materials as alternatives alkoxysilane and paid attention to water glass as a promising material. Another process for producing an aerogel made from water glass is disclosed in JPA-SHO47-15,398, U.S. Pat. No. 5,137,927 and JPA-HEI2-304,299. In the process, since supercritical drying is performed using an alcohol as a dispersion medium, the resulting aerogel has transient hydrophobicity, but deteriorates over time, as described above.

SUMMARY OF THE INVENTION

The present invention to provide a process for efficiently producing an aerogel which has excellent heat insulating properties and transparency, and which can prevent deterioration of these properties with time due to water or moisture.

A process of the present invention comprises the steps of, preparing a sol as a hydrosol from a water glass solution by lowering a pH value thereof; gelling the sol to obtain a gel as a hydrogel; reacting the gel with a hydrophobilizing agent having hydrophobic groups as well as functional groups reactive with silanol groups; and supercritically drying the gel to obtain an aerogel. According to the present invention, by performing supercritical drying, an aerogel is produced an aerogel that is formed into a porous structure without shrinking and is excellent in such properties as heat insulating properties peculiar to porous materials and transparency. Moreover, by hydrophobilizing the aerogel, the above properties are deteriorate difficulty with time due to water or moisture. Further, according to the present invention, non-defective aerogels are more efficiently obtained in comparison with a process using alkoxysilanes as a starting material. Since a water glass solution is used as a starting material in the present invention, the sol and the gel respectively become a hydrosol and a hydrogel containing water as a dispersion medium, the water is not easily volatilized in a short time even when the sol or the gel is exposed to the air. Therefore, the resulting aerogel does not manifest cracks or shrinkage prior to supercritical drying.

The present invention includes two aspects, each having a different way of reacting the gel with the hydrophobilizing agent.

In the first aspect of the invention, after replacing water in the gel with an organic solvent, this gel is reacted with a hydrophobilizing agent in liquid phase. The solvent contained in the resulting gel is then removed by supercritically drying, to obtain a hydrophobic aerogel.

On the other hand, in the second aspect of the invention, the gel is reacted with a hydrophobilizing agent in a dispersion medium in the state of a supercritical fluid while supercritically drying the gel. In this case, since a hydrophobilizing treatment is carried out while supercritically drying the gel, there is the following merit in comparison with the first aspect. That is, in the first aspect in which supercritical drying is performed after hydrophobilizing treatment in liquid phase, a diffusion rate of the hydrophobilizing agent into the gel is slow and the reaction of the hydrophobilizing treatment requires a long time. Also, the extent of the hydrophobilizing treatment is not always uniform between outside portion and inner portion of the gels. Furthermore, it is necessary to use a large quantity of an organic solvent for washing the gels before and after the hydrophobilizing treatment. In the second aspect, a diffusion rate of the hydrophobilizing agent into the gel is high, and the hydrophobilizing treatment can be and rapidly uniformly done in the inner portion of the gels. Also, it is not necessary to use a large quantity of an organic solvent, as in the first aspect.

The present invention includes the third aspect in which the steps of preparing the sol and gelling the sol to obtain a gel are performed as follows. That is, in the third aspect in the invention, the step of preparing the sol includes ion exchange of a water glass solution to obtain a sol by using an ion exchange resin, and the step of gelling the sol includes suspension polymerization of the resulting sol ion-exchanged above, wherein the ion exchange resin has 1 or more of molar ratio based on moles of an alkali metal in the water glass solution and is capable of ion exchanging for the alkali metal.

In the case of the third aspect, since a water glass solution is ion-exchanged by using the ion exchange resin mentioned above, alkali metals contained in the water glass solution are removed, and a pH value thereof is lowered to form the sol and, thus, a decrease in transparency of the aerogel due to the presence of the alkali metal can be prevented.

In the present invention, it is preferable that the suspension polymerization for obtaining the gel from the sol is carried out by stirring a poor solvent while adding the sol dropwise to the poor solvent which dose not dissolve the gel. In this case, the added sol is gelled while being dispersed into the poor solvent, to become a spherical gel to obtain, generally spherical aerogels with uniformly bead-like or particulate shape. Since no cracks arise due to this shape, a better yield can be obtained. In addition, packing into a panel or the like becomes easy. In particular, the present invention uses a water glass solution as a starting material to obtain the sol as a hydrosol, and the poor solvent is easily selected from organic solvents and the like. For example, the poor solvent can be selected from the group consisting of silicone oil, xylene, benzene, toluene, cyclohexane, castor oil and the like.

Also, it is preferable that the sol is neutralized with a basic substance. The neutralization of the sol can be performed by adding the basic substance to the sol, or by adding the basic substance to the poor solvent. In the former case, since the sol can be brought into a state of easy gelation, the suspension polymerization for obtaining the gel can be easily done. In the latter case, since the sol can be gelled while sufficiently dispersing the sol in the poor solvent, generally spherical aerogels with uniform bead-like or particulate shape can be easily obtained. The basic substance is, for example, selected from the group consisting of ammonia, pyridine, hydrazine, piperidine and the like.

Also, it is preferable to add a dispersant to the poor solvent. In this case, the sol is efficiently dispersed in the poor solvent when the suspension polymerization is performed, so that generally spherical aerogels with uniform bead-like or particulate shape can be easily obtained.

These and further objects, purposes, features, and advantages of the present invention will become apparent to those skilled in the art upon further study of the specification and appended claims.

DETAILED DESCRIPTION OF THE INVENTION

The present invention will now be described in detail.

A process for producing an aerogel according to the first aspect of the present invention comprises the steps of: preparing a sol (hydrosol) from a water glass solution by lowering a pH value thereof; gelling the sol to obtain a gel (hydrogel); after replacing water in the gel with an organic solvent, reacting the gel with a hydrophobilizing agent in liquid phase to obtain a gel, wherein the hydrophobic agent has hydrophobic groups as well as functional groups reactive with silanol groups; and supercritically drying the resulting gel. As a result of the essential features of the steps mentioned above, a crack or craze-free aerogel can be efficiently produced, which provides heat insulating properties and transparency resistant from deterioration over time due to water or moisture.

A step of preparing the gel (hydrogel) is described below. In the present invention, a water glass solution is used as a starting material. This water glass solution means an aqueous alkali metal silicate solution such as aqueous sodium silicate solution, aqueous potassium silicate solution and the like. Water glass is represented by the following formula:

$$m(M_2O).n(SiO_2)$$

wherein m and n represent a positive integer, and M is an alkali metal atom. A standard of the water glass is shown in JIS K1408. The water glass solution includes a colloidal solution of a silica sol. The concentration of silica contained in the water glass solution is not limited but may be appropriately selected depending upon consideration of desired properties such as transparency, bulk density, refractive index, heat insulating properties and the like.

As a method of lowering the pH value of the water glass solution, there is a method of adding a gelling agent thereto and a method of using an ion exchange resin. In the former case, the usable gelling agents are, for example, inorganic acids such as sulfuric acid, hydrochloric acid, nitric acid and the like; and organic acids such as oxalic acid, ammonium carbonate, acetic acid and the like. The pH value of the water glass solution is lowered by adding such the gelling agent thereto. Upon this, an amount of the gelling agent to be added to the water glass solution is not limited but is adjusted appropriately to lower the pH value so as to obtain a sol in a stable state where rapid gelation dose not occur in a short time. In the latter case, there methods for removing alkali metal ions include passing the water glass solution through a layer filled with the ion exchange resin, and a method of mixing the ion exchange resin in the water glass solution, stirring the mixture to remove alkali metal ions and thereafter filtering the mixture to separate the ion exchange resin therefrom.

As a method of gelling the sol, method include heating the sol placed in a vessel and a method of heating the sol in a poor solvent or vapor thereof. In the former case, it is possible to obtain a gel which is kept in a desired shape by gelling the sol in a vessel having the same shape, further to obtain an aerogel having a desired shape by supercritically drying the gel having that shape while keeping the shape. On the other hand, in the latter case, the usable poor solvents are, for example, xylene, benzene, toluene, cyclohexane, oils, silicone oil and the like. By adding the sol to the poor solvent like this and then gelling the sol while stirring under heating, an aerogel having generally spherical shape is obtained. The heating temperature is not limited to specific temperature but depends upon pH value or the silica concentration of the sol. When the gelation of the sol can be done well at room temperature, it is not necessarily required to use heat.

Electrolytes including alkali metals such as sodium and the like may be removed from the resultant gel by washing with water or acids. In the case where an ion exchange resin is used for gelling the sol, it is possible to omit the above washing process, because alkali metal ions contained in the sol have been removed by hydrogen ion substitution.

In the present invention, since a water glass solution is used as a starting material and the sol is prepared from the water glass solution by lowing the pH value of the water glass solution, the resultant sol is in a stable state of not gelling for a relatively long time. Also, the time required for making the gel from the sol can be shortened by accelerating gelation of the sol by heating the sol or adding basic substance thereto. Moreover, since a solvent (dispersion medium) of the sol and the gel is water as a natural consequence of the use of a water glass solution as a starting material, the solvent (water) is not easily volatilized over a short time even when the sol or the gel is exposed to the air during any step of preparing the sol, gelation and curing and the gel, the resulting aerogel does not manifest cracks or shrinkage prior to supercritical drying. Therefore, off-qualities included in the resulting aerogels obtained after supercritical drying are decreased, a yield of non-defectives of the aerogel is increased and the productivity of the aerogel is improved. Further, handling of forming the gel can be improved. Additionally, in preparing the sol, a pH value of a water glass solution may be lowered under suitable control so that the stability of the obtained sol is at a desirable level. In this way, it is possible to make the sol stabilized so as not to be gelled in a range of a few seconds to several tens of hours at room temperature.

A step for hydrophobilizing the gel will be described below. In the first aspect of the present invention, in order to give hydrophobicity to the surface of the gel, the gel is reacted with a hydrophobilizing agent having hydrophobic groups as well as functional groups reactive with silanol groups in liquid phase, after water in the gel is replaced with an organic solvent. More particularly, the gel is a gel-like compound of a polymer having silanol groups and a skeleton represented by $(SiO_2)m$ wherein m represents a positive integer (hereinafter, referred to as "raw polymer"), and hydroxyl groups in silanol groups of the raw polymer are substituted with hydrophobic groups of the hydrophobilizing agent. Thereby, an aerogel obtained after the supercritical drying, mentioned below, becomes hydrophobic and does not adsorb water or moisture, which leads to the prevention of deterioration of properties over time due to water or moisture.

When the hydrophobilizing treatment is performed, it is necessary to remove water contained in the gel in advance and, for this purpose, the water in the gel is replaced with an organic solvent beforehand. Thereby, a reaction of the hydrophobilizing agent with the silanol groups can be efficiently performed without being prevented by water or moisture. The organic solvent used for this is not limited to a specific one but it is preferable that a solvent for dissolving the hydrophobilizing agent mentioned below is used.

The hydrophobilizing agent refers to a compound having hydrophobic groups as well as functional groups reactive with silanol groups. Examples of the functional groups include halogen, amino group, imino group, carboxyl group and alkoxyl group. Examples of the hydrophobic groups include alkyl group, phenyl group and fluorides thereof. The hydrophobilizing agent may have one kind of the aforementioned functional groups and the hydrophobic groups, respectively, or two or more of them. Embodiments of the hydrophobilizing agent include organosilane compounds such as hexamethyldisilazane, hexamethyldisiloxane, trimethylchlorosilane, trimethylmethoxysilane, trimethylethoxysilane, triethylethoxysilane, triethylmethoxysilane, dimethyldichlorosilane, dimethyldiethoxysilane, methyltrichlorosilane, ethyltrichlorosilane and the like and, besides them, organic compounds such as carboxylic acids such as acetic acid, formic acid, and succinic acid and the like, and halogenated alkyls such as methyl chloride and the like. The hydrophobilizing agent may be used alone or in a combination of two or more.

Examples of the method of the hydrophobilizing treatment is not limited to specific one but include a method of immersing the gel into a solution obtained by dissolving the hydrophobilizing agent in a solvent and mixing a mixture to permeate the hydrophobilizing agent into the gel and, thereafter, performing a hydrophobilizing treatment by heating the mixture as necessary. Examples of the solvent used at the hydrophobilizing treatment are methanol, ethanol, toluene, benzene, N,N-dimethylformamide and the like. However, the solvent is not limited to the above examples, and any solvents may be used as long as they can easily dissolve the above hydrophobilizing agent and can be replaced with a solvent (dispersion medium) contained in the gel. In view of later supercritical drying, the solvent is preferably the same solvent as a medium which is easy for supercritical drying (e.g. methanol, ethanol, liquid carbon dioxide), or a medium which is easily replaced with the aforementioned mediums. An amount of the solvent is not limited to specified one.

Preferably, the hydrophobilizing agent in the hydrophobilizing treatment is used at an amount corresponding to the number of moles that is enough to react with all silanol groups on the surface of the raw polymer constituting the gel. For example, an amount of the hydrophobilizing agent is preferably in a range of a ratio by weight of around 0.5 to 10 based on (the raw polymer)/(the hydrophobilizing agent). However, the amount of the hydrophobilizing agent is not limited thereto. Since it may be selected depending upon an amount of the used solvent, temperature and time for the hydrophobilization-treating reaction, and the balance between the costs and performance of the hydrophobilizing agent.

The hydrophobilization-treated gel (hydrophobic gel) as mentioned above is composed of two phases: the first phase being a solid matter of a modified polymer hydrophobilized by substituting hydroxyl groups of silanol groups harbored by the raw polymer with hydrophobic groups; and the second phase being a dispersion medium (solvent).

Next, a process of supercritically drying the gel will be described below. Here, the supercritical drying refers to a drying method for gradually removing a dispersion medium contained in the gel in the atmosphere at a critical point of the dispersion medium or under higher temperature and higher pressure over the above-mentioned critical point. Upon performing the supercritical drying, a dispersion medium contained in the gel of the modified polymer is previously replaced with a dispersion medium for use as a medium in supercritical drying, if necessary. Upon this, it is preferable that the dispersion medium for using as a medium in the supercritical drying is a compound having a lower critical point than that of the dispersion medium contained in the gel of the modified polymer, but is not limited thereto. For example, a solvent used in hydrophobilizing the gel may be used as the medium in supercritical drying as it is. In this case, it is not necessary to replace a dispersion medium (solvent).

The dispersion medium for using as a medium in the supercritical drying is preferably such that a temperature and a pressure over a critical point are easy to set, but is not limited thereto. Embodiments of the dispersion medium include alcohols such as methanol, ethanol, propanol, isopropanol, butanol and the like, dichlorodifluoromethane, liquefied carbon dioxide, water, and the mixture thereof. The dispersion medium for using as a medium in the supercritical drying may be the same as the solvent used for hydrophobilizing the gel mentioned above, or may be a different solvent from the solvent used for hydrophobilizing the gel.

Examples of the method of supercritically drying the gel is not limited to specified one but include a method by replacing a part of or whole alcohol contained in the gel of the modified polymer with liquid carbon dioxide having a lower critical point than that of the alcohol by dipping the gel of the modified polymer into liquefied carbon dioxide (around 50 to 60 normal atmospheres), and then drying the gel under a supercritical condition of sole carbon dioxide or the mixture of carbon dioxide and the alcohol, and a method by drying the gel of the modified polymer under a supercritical condition of an alcohol contained in the gel as a solvent, without replacement with carbon dioxide.

In the present invention, an aerogel (porous material) having excellent hydrophobicity and transparency is obtained by the method for supercritically drying the gel, since a solvent contained in the gel is removed in an atmosphere at a critical point of the solvent or under higher temperature and higher pressure over the critical point. Upon this, since phase transition such as so-called gasification and condensation of a solvent does not occur in an atmosphere under a supercritical condition, breaking of the structure of the gel and coalescence of the gel can be suppressed upon removal of the solvent. Therefore, the aerogel obtained by supercritical drying becomes porous. In addition, since the gel is hydrophobilized in liquid phase, shrinkage of the gel hardly occurs upon supercritical drying. Therefore, the aerogel obtained by removing a solvent from the gel is light in weight and has excellent performance in heat insulating properties and the like.

The aerogel obtained by the process of the first aspect of the present invention has a structure composed of very fine silica particles, an average particle diameter of which is much smaller than the wavelength of the light and an interparticle space of the silica particles is uniform and smaller than mean free path of the air and, thus, thermal conductivity of the aerogel is small and the aerogel has transparency in spite of the porous structure thereof.

Next, the second aspect of the present invention will be described.

A process for producing an aerogel according to the second aspect of the present invention comprises the steps of: preparing a sol (hydrosol) from a water glass solution, which is used as a starting material, by lowering a pH value of the water glass solution; gelling the sol to obtain a gel (hydrogel or gel-like compound); and reacting the gel with a hydrophobilizing agent in a dispersion medium of a supercritical fluid while supercritically drying the gel, said hydrophobilizing agent having hydrophobic groups as well as functional groups reactive with silanol groups. As a result of the essential features of the steps mentioned above, an aerogel, which is capable of preventing heat insulating properties and transparency thereof from deteriorating with time due to water or moisture, can be efficiently produced in a state of no cracks or crazes.

In the process for producing an aerogel according to the second aspect of the invention, the steps of preparing a sol as a hydrosol from a water glass solution by lowering a pH value thereof, and of gelling the sol to obtain a gel as a hydrogel are performed in the same manner as that in the process for producing an aerogel according to the first aspect mentioned above. Therefore, detailed descriptions of these steps are omitted herein.

The second aspect is different from the first aspect in that the gel (hydrogel) is then hydrophobilized at the same time with supercritical drying.

A step of supercritically drying the gel in the second aspect will be described below. Here, a supercritical drying method is as described in the first aspect of the present invention. Thus, in the course of the step of supercritical drying according to the second aspect, since phase transitions such as so-called gasification and condensation of a solvent does not occur in an atmosphere under a supercritical condition, breaking of the structure of the gel and coalescence of the gel can be suppressed upon removal of a solvent thereof, therefore the aerogel obtained by supercritical drying becomes porous, as described in the first aspect.

A dispersion medium used in the step of supercritically drying the gel is a medium which is in a supercritical state under such the temperature and the pressure that a hydrophobilizing agent is not decomposed, and in which the hydrophobilizing agent is dissolved in the dispersion medium under a supercritical condition (supercritical fluid). Examples of the dispersion medium include ethanol, methanol, dichlorodifluoromethane, carbon dioxide, water and a mixture thereof.

When the dispersion medium is used alone, usually, after the first solvent contained in the gel is replaced with the second solvent that is the same as the aforementioned dispersion medium, the gel is put into a pressure-resistant container together with the second solvent and then a temperature and pressure in the container is raised upto or over a critical point of the dispersion medium to remove the second solvent contained in the gel. When the mixture of two or more aforementioned dispersion mediums is used, there are, for example, a method by placing the gel and the dispersion medium into a pressure-resistant container, and then raising a temperature and pressure in the container so that a solvent contained in the gel dissolves into the dispersion medium mixed with the gel in the container and an atmosphere in the container is brought into a supercritical condition in a monophase state; and a method by placing the gel in the same solvent as that contained in the gel in a pressure-resistant container, replacing the solvent in the container with another solvent having the higher solubility under a condition of high pressure, approximately completing the solvent replacement and, thereafter, bringing the another solvent into a supercritical condition to remove the solvent contained in the gel.

In the second aspect of the invention, hydrophobilizing-treatment is performed upon supercritical drying. More particularly, the hydrophobilizing agent is added to the dispersion medium brought into a supercritical condition thereof to hydrophobilize the gel. The hydrophobilizing agent, which has hydrophobic groups as well as functional groups reactive with silanol groups, is not decomposed under the supercritical condition of the dispersion medium, and easily dissolves into the dispersion medium in a state of a supercritical fluid. Examples of the functional groups reactive with silanol groups and the hydrophobic groups of the hydrophobilizing agent are the same as those described in the first aspect of the invention. The hydrophobilizing agent may have one kind of the functional groups as well as the hydrophobic groups, respectively, or two or more of them, as is described in the first aspect. Moreover, embodiments of the hydrophobilizing agent include the same ones as described in the first aspect of the invention. Further, one kind of or more of the hydrophobilizing agents may be used, as is also described in the first aspect.

As the condition for hydrophobilizing-treatment, such a temperature and/or pressure is appropriately selected that the dispersion medium is brought into a supercritical state and the hydrophobilizing agent is not decomposed.

In the second aspect of the present invention, the aerogel after supercritical drying does not adsorb moisture in the atmosphere and, thus, deterioration of the properties of the resultant aerogel with time due to adsorption of water is eliminated, because hydroxyl groups of silanol groups on the surface of the gel have been replaced with the hydrophobic groups of the hydrophobilizing agent. Particularly, in the second aspect of the present invention, since hydrophobilization of the gel is performed during supercritical drying by allowing the hydrophobilizing agent to be present in the dispersion medium in a supercritical state under heating and pressure, the hydrophobilizing agent is rapidly diffused into the dispersion medium and, thus, the gel can be uniformly hydrophobilized toward the inner portion thereof in a short time, which leads to improvement on efficacy of hydrophobilization.

The aerogel obtained by the process of the second aspect mentioned above has the structure composed of fine silica particles as in the first aspect. Since an average particle size of the silica particles of the aerogel is much smaller than the wavelength of the light and an interparticle space of the silica particles is uniform and smaller than mean free path of the air, thermal conductivity of the aerogel is small, and the aerogel has transparency in spite of porous structure thereof. Moreover, an aerogel having good hydrophobicity and having no crazes and cracks is efficiently obtained. Further, according to the second aspect of the invention, since the steps of supercritical drying and hydrophobilization may be performed immediately after formation of the gel (hydrogel), it is possible to omit a step of replacing a solvent contained in the gel. Moreover, since hydrophobilization is performed at the same time with supercritical drying, an amount of an organic solvent for using as a dispersion medium of the hydrophobilizing agent can be decreased in comparison with the hydrophobilization in liquid phase. Additionally, the unreacted hydrophobilizing agent may be easily separated and recovered in the step of hydrophobilization.

Next, the third aspect of the present invention will be described.

In the process for producing an aerogel according to the third aspect, as the steps of preparing the sol by lowering a pH value a water glass solution and gelling the sol to obtain a gel in the first and second aspects, the following steps are performed. That is, in the third aspect of the present invention, a sol is prepared by ion exchanging a water glass solution by using an ion exchange resin having 1 or more of molar ratio based on moles of alkali metals in the water glass solution and being capable of ion exchanging the alkali metals, to obtain a sol, which is gelled by suspension polymerization.

In the third aspect, since a water glass solution as a starting material is the same as that of the first aspect of the invention, detailed descriptions of the water glass solution are omitted herein.

As the ion exchange resin in the third aspect, cation exchange resins such as styrenic, acrylic and methacrylic ones can be used. Alkali metal atoms such as sodium atoms contained in the water glass solution are removed by ion exchange using such the ion exchange resins. Here, it is necessary to set the ion exchange resin at such an amount that can exchange all the alkali metal atoms contained in the water glass with hydrogen atoms. That is, it is necessary to set an amount of the ion exchange resin so that a ratio of number of moles (total exchange capacity) of the hydrogen atoms of the ion exchange resin relative to number of moles of alkali metal atoms contained in the water glass solution to be ion exchanged is 1 or more. Here, an upper limit of the ratio, which is not limited but, is preferably 3 because the use of an increasing amount of the ion exchange resin leads to the economical disadvantage. More preferably, the ratio is in a range of 1 to 2.

Examples of the method of ion exchanging the water glass solution with the ion exchange resin include a method by passing the water glass solution through a layer filled with the ion exchange resin to replace alkali metal ions with hydrogen ions and a method by mixing the ion exchange resin with the water glass solution, stirring the mixture to replace alkali metal ions with hydrogen ions, and then separating the ion exchange resin therefrom by filtration. The thus ion exchanged water glass solution in which alkali metal atoms have been exchanged with hydrogen atoms, becomes a hydrosol being an acidic solution.

Since a pH value of the hydrosol after ion exchange as mentioned above is lowered to around 2 to 4, a basic substance is added to the hydrosol in order to allow the hydrosol to be easily gelled. Examples of the basic substance include ammonia, pyridine, hydrazine, piperidine and the like, and these may be used alone or in a combination thereof. The pH value of the hydrosol is adjusted to around neutral by adding these basic substances to the hydrosol so as to gel the hydrosol at the time when a predetermined period of time has elapsed. It is preferable to regulate an amount of the basic substance to be added so that the pH value of the hydrosol is brought into a range of 5 to 7.

Then, this hydrosol is suspension-polymerized. The suspension polymerization can be carried out by using a poor solvent which dose not dissolve the hydrosol after ion exchange, adding dropwise the hydrosol to the poor solvent while stirring the poor solvent, and stirring until a predetermined time required for gelling the hydrosol has elapsed. Examples of the poor solvent are silicone oil, xylene, benzene, toluene, cyclohexane, castor oil and the like and they may be used alone or in a combination thereof. Thus, by gelling the hydrosol by adding dropwise the hydrosol while stirring the poor solvent, the hydrosol is gelled while being dispersed into the poor solvent, resulting in appropriately spherical bead-like hydrogel.

Here, a diameter of the bead-like hydrogel varies depending upon the stirring conditions upon suspension polymerization, that is, shape and size of a container, shape and size of a stirrer, a rate of stirring, a ratio of the hydrosol and the poor solvent. Therefore, by varying the stirring conditions, the hydrogel having an arbitral bead diameter can be obtained.

In addition, by adding a dispersant to the poor solvent in advance, the hydrosol can be efficiently dispersed into the poor solvent. As the dispersant, polyvalent alcohol fatty acid ester among nonionic surfactants such as metallic soap, lanolin, rosin, cholesterin, lecithin, sorbitan monooleic ester and the like may be used. The dispersant is preferably added to the poor solvent at an amount of 1 to 20% by weight, more preferably 5 to 10% by weight.

Although, in the above case, a basic substance was added to the ion exchanged hydrosol at a stage before suspension polymerization step, the basic substance may be added to the poor solvent. The addition of the basic substance to the poor solvent may be performed as follows: after the hydrogel is added dropwise to the poor solvent, the basic substance may be added to the suspension while stirring, or alternatively the basic substance may be previously added to the poor solvent and to this may be added dropwise to the hydrogel while stirring.

Next, after thus obtained gel is washed with water or acidic water, the gel is reacted with a hydrophobilizing agent to perform hydrophobilizing treatment. Water is preferably previously removed from the gel in order to effectively perform hydrophobilizing treatment. A method for removing water contained in the gel is not limited to specified one but a method by washing the gel using a solvent for dissolving the hydrophobilizing agent described below is preferable.

A hydrophobilizing agent has hydrophobic groups as well as functional groups reactive with silanols and embodiments of the hydrophobic groups and functional groups are the same as described for the first aspect of the present invention. Additionally, a method for hydrophobilization, for example, an amount of a solvent to be used and that of the hydrophobilizing agent are the same as described for the first aspect of the present invention. The hydrophobilized gel is hydrophobilized so that hydroxyl group of silanol groups contained in the gel are replaced with hydrophobic groups and is composed of two phases of solid matter of the gel and a solvent used in suspension polymerization or hydrophobilizing treatment.

Then, the thus hydrophobilized gel is supercritically dried. Solvents used as a dispersion medium for supercritical drying and a method for supercritically drying the hydrophobilized gel are the same as those described for the first aspect of the present invention.

Further, when a solvent used for hydrophobilizing the gel is the same as that used for supercritical drying, if hydrophobilization is performed in the supercritical state, hydrophobilizing treatment and supercritical drying may be carried out in a series of continuous steps.

Thus, an aerogel can be obtained by removing a solvent contained in the gel by performing supercritical drying. Since phase transition, that is, so-called gasification and condensation of the solvent dose not occur in such a supercritical drying, breakage and coalescence of the structure of the gel can be suppressed and the resultant aerogel becomes porous and, thus, has high heat insulating performance. Since a diameter of the silica particles is far smaller than light wavelength and the interparticle space is smaller than mean free path for the air and uniform, thereby, the aerogel has high transparency in spite of the porous material. Further, the aerogel is hydrophobilized by substituting hydroxy groups in silanol groups on the surface thereof with a hydrophobic group of the hydrophobilizing agent, moisture in the atmosphere is not absorbed onto the aerogel and, thus, a change over time in properties and transparency of the aerogel due to absorption and moisture absorption can be prevented.

Thus, aerogels manufactured by the first to third aspects of the present invention can be used in, for example, thermal insulating material at an opening, sound material, Cerenkov element, catalyst support and the like. Here, the aerogel is obtained in the form of a bead and, when the aerogel is used as a heat insulating material, a diameter of the bead may be appropriately selected depending upon the thickness and the required performances of the heat insulating material used. When the higher heat insulating properties are required, it is preferable that a plurality of aerogels having the different bead diameter are mixed to raise the packing density.

EXAMPLES

The following Examples and Comparative Examples further illustrate the present invention in detail but are not to be construed to limit the scope thereof.

Example 1

A solution (A Solution) obtained by mixing an aqueous solution of sodium silicate (manufactured by Nihon Kagakukogyo K.K., J Sodium Silicate No. 3) and water at a ratio of 10:16 parts and a 0.95 mol/L aqueous solution of sulfuric acid (B Solution) were prepared, A Solution and B Solution were mixed at a ratio of 26:16 parts, stirred for 1 minute, and the resulting sol was cast into a cylindrical container. This sol was gelled by heating at 60° C. to obtain a hydrogel (gel-like compound).

The resulting hydrogel was immersed into acidic water which had been adjusted to pH 3, and washed for 24 hours by exchanging acidic water repeatedly while stirring. Thereafter, the hydrogel was washed using distilled water. Further, the hydrogel was immersed into ethanol, and ethanol was repeatedly exchanged while stirring, to perform solvent substitution for 24 hours.

Then, the gel was immersed into 1.2 mol/L—hexamethyldisilazane (reagent manufactured by Torey Dow Corning Silicone LTD.) and hydrophobilization-treated while stirring at 78° C. for 24 hours. Thereafter, the gel was transferred into ethanol, and solvent substitution was performed for 24 hours by exchanging ethanol repeatedly while stirring.

Then, this gel was placed in carbon dioxide at 18° C. and 55 normal atmospheres, an operation was carried out for 2 to 3 hours so as to substitute ethanol in the gel with carbon dioxide. Thereafter, the system was brought into atmosphere at 40° C. and 80 normal atmospheres under a supercritical condition of carbon dioxide, and supercritical drying was performed for about 24 hours to obtain a hydrophobic aerogel sample. The resulting sample was a discoidal monolithic body (plate-like) having the thickness of 10 mm and the diameter of 50 mm.

Example 2

A solution obtained by mixing 10 parts of the same aqueous solution of sodium silicate as that in Example 1 and 32 parts of water was passed through a column filled with an ion exchange resin (Amberlite IR-120B; manufactured by Organo K.K.). A pH value of the sol obtained by passing through an ion exchange resin layer was about 8. According to the same manner as that in Example 1 except that the thus obtained sol was used, a hydrophobic aerogel sample (monolithic body) (plate-like) was obtained.

Example 3

An aerogel was formed acording to the same manner as that in Example 1 except that trimethylchlorosilane was used in place of hexamethyldisilazane, a hydrophobic aerogel sample (monolithic body) (plate-like) was obtained.

Example 4

A colloidal solution of silica sol (Silicadol 30S; manufactured by Nihon Kagakukogyo K.K.) and 0.028 mol/L aqueous sulfuric acid were mixed at a ratio of 3:10 parts, stirred for 1 hour and the resulting sol was cast into a container. This sol was gelled by heating at 60° C. to obtain a hydrogel. Thereafter, the same method as that in Example 1 afforded a sample (monolithic body) (plate-like).

Comparative Example 1

A hydrophobic aerogel was obtained starting with alkoxysilane. That is, tetramethoxysilane oligomer (Methyl Silicate 51, average molecular weight 470; manufactured by Colcoat LTD.) as alkoxysilane, ethanol and water as a solvent, and 15N aqueous ammonia as a catalyst were prepared, the tetramethoxysilane oligomer, ethanol, water and 15N aqueous ammonia were blended at a ratio of 47:198:35:1.3 parts, stirred for 1 minute to obtain a sol which was cast into a container and allowed to stand at room temperature for 1 day to obtain a gel. The resultant gel was used to perform solvent substitution with ethanol, hydrophobilizing treatment and supercritical drying to obtain a hydrophobic aerogel (monolithic body) (plate-like).

Comparative Example 2

An aerogel was formed according to the same manner as that in Example 1 except that hydrophobilizing treatment was not performed, a sample (monolithic body) (plate-like) was obtained.

Comparative Example 3

An aerogel was formed according to the same manner as that in Example 1 except that hydrophobilizing treatment was not performed and a supercritical condition of ethanol was set at 250° C. and 80 normal atmospheres by using ethanol in place of carbon dioxide as a dispersion medium at supercritical drying, a sample (monolithic body) (plate-like) was obtained.

Bulk density before and after humidity testing as well as heat conductivity and light transmittance were measured and a yield of the preparation step was evaluated regarding the respective aerogel samples obtained in Examples 1–4 and Comparative Examples 1–3. In addition, in a case where the form of the resultant sample was monolithic, a yield at a sample preparing steps was evaluated. The results are shown in Table 1.

The conditions for evaluating various performances are as follows:

A humidity test was performed by allowing an aerogel to stand at a temperature of 60° C. and humidity of 90% for 48 hours. As regards heat conductivity, heat conductivity at 20 to 40° C. was measured using a heat conductivity measuring apparatus (manufactured by Eikoseiki K.K.) based on ASTM-C518. Light transmittance was obtained by measuring illuminance using an illuminometer (Yokogawa Instruments K.K., Model 510-02) and using a fluorescent lamp as a light source in an acrylic box before and after a sample was mounted. As regards yield evaluation, the appearances of the sample (craze, crack and the like) were visually observed and the sample having no perceivable craze and crack was regarded as a non-defective and a proportion of non-defectives was adopted as a yield at a sample preparation step.

The results of the measurement are shown in Table 1.

TABLE 1

| | Raw of Silica | Method of pH-control | Shape of Aerogel | Water Washing | Hydrophobic Agent | Dispersion Medium of Supercritical Drying | Yield of Aerogel (%) | Bulk Density (g/cc) Before Humidity test | Bulk Density (g/cc) After Humidity Test | Light Transmittance (%) | Heat Conductivity (W/mK) |
|---|---|---|---|---|---|---|---|---|---|---|---|
| EXAMPLE 1 | Sodium silicate | Sulfuric acid | Monolithic | Yes | Hexamethyldisilazane | Carbon dioxide | 100 | 0.108 | 0.109 | 87 | 0.014 |
| EXAMPLE 2 | Sodium silicate | ion exchange resin | Monolithic | Yes | Hexamethyldisilazane | Carbon dioxide | 95 | 0.107 | 0.107 | 88 | 0.012 |
| EXAMPLE 3 | Sodium silicate | Sulfuric acid | Monolithic | Yes | Trimethylchlorosilane | Carbon dioxide | 95 | 0.110 | 0.112 | 86 | 0.015 |
| EXAMPLE 4 | Silica-coloid Solution | Sulfuric acid | Monolithic | Yes | Hexamethyldisilazane | Carbon dioxide | 100 | 0.107 | 0.107 | 85 | 0.012 |
| COMPARATIVE EXAMPLE 1 | Oligomer of Tetramethoxysilane | — | Monolithic | — | Hexamethyldisilazane | Carbon dioxide | 75 | 0.109 | 0.110 | 91 | 0.012 |
| COMPARATIVE EXAMPLE 2 | Sodium silicate | Sulfuric acid | Monolithic | Yes | — | Carbon dioxide | 90 | 0.108 | 0.413 | 84 | 0.013 |
| COMPARATIVE EXAMPLE 3 | Sodium silicate | Sulfuric acid | Monolithic | Yes | — | Ethanol | 95 | 0.112 | 0.358 | 84 | 0.014 |

From the results shown in Table 1, regarding samples of Examples 1–4, it can be said that since little change in bulk density was observed before and after a humidity test, moisture adsorption was prevented and all of heat conductivity, light transmittance and a yield were good. To the contrary, it is seen that, in Comparative Example 1 where alkoxysilane was used as a starting material, the yield is bad and, in Comparative Examples 2 to 3 where hydrophobilizing treatment was not performed using the hydrophobilizagent, bulk density after a humidity test was increased due to moisture adsorption as compared with before a humidity test.

Example 5

A solution (A Solution) obtained by mixing an aqueous solution of sodium silicate (manufactured by Nihon Kagakukogyo K.K., J Sodium Silicate No. 3) and water at a ratio of 10:16 parts and a 0.95 mol/L aqueous solution of sulfuric acid (B Solution) were prepared, A Solution and B Solution were mixed at a ratio of 26:16 parts, stirred for 1 minute, and the resulting sol was cast into a cylindrical container. This sol was gelled by heating at 60° C. to obtain a hydrogel.

The resulting hydrogel was immersed into acidic water which had been adjusted to pH 3, and washed for 24 hours by repeatedly exchanging acidic water while stirring. Thereafter, the hydrogel was washed for 24 hours using distilled water. Further, the hydrogel was immersed into ethanol, ethanol was repeatedly exchanged while stirring, to perform solvent substitution for 24 hours.

Then, using a supercritical gas extracting and separating apparatus (manufactured by AKICO LTD.; Model S-2-2) having volume of 2 liters as a pressure container, the gel was placed into liquefied carbon dioxide at 18° C. and 55 normal atmospheres. Then, operations were performed substituting ethanol in the gel with carbon dioxide for 2 to 3 hours, and the atmosphere was brought into a supercritical condition of carbon dioxide at 80° C. and 160 normal atmospheres. 0.6 moles of hexamethyldisilazane as a hydrophobilizing agent was added to the atmosphere in the supercritical state, the hydrophobilizing agent was diffused into the supercritical fluid and allowed to stand over 2 hours to perform hydrophobilizing treatment. Thereafter, carbon dioxide in the supercritical state was further passed therethrough and pressure was reduced to remove ethanol contained in the gel and carbon dioxide, to obtain a hydrophobic aerogel after removal from the pressure container. The sample obtained was a monolithic body (plate-like) having the thickness of 10 mm. A time required for hydrophobilizing treatment including diffusion of the hydrophobilizing agent into the supercritical fluid, a reaction by allowing to stand, and carbon dioxide flow was 15 hours.

Example 6

An aerogel was formed according to the same manner as that in Example 5 except that trimethylchlorosilane was used as a hydrophobilizing agent in place of hexamethyldisilazane, a hydrophobic aerogel was obtained. The sample obtained was a monolithic body (plate-like) having the thickness of 10 mm.

Example 7

A colloidal solution of silica sol (manufactured by Nihon Kagakukogyo K.K.; Silicadol 30S) and a 0.028 mol/L aqueous sulfuric solution were mixed at a ratio of 3:10 parts and stirred for 1 minutes to obtain a sol which was cast into a container. This sol was gelled by heating at 60° C. to obtain a hydrogel. Thereafter, the same manner as that in Example 5 was performed to obtain a sample of a hydrophobic aerogel. This sample was a monolithic body (plate-like) having the thickness of 10 mm.

Comparative Example 4

According to the same manner as that in Example 5 except that hydrophobilizing treatment was not performed at supercritical drying, a sample of an aerogel (monolithic body) (plate-like) was obtained.

Comparative Example 5

A hydrophobic aerogel was prepared starting with alkoxysilane. That is, oligomer of tetramethoxysilane (manufactured by Colcoat LTD.; Methyl Silicate 51, average molecular weight about 470) as alkoxysilane, ethanol and water as a solvent, and 15 N aqueous ammonia as a catalyst were prepared. The oligomer of tetramethoxysilane, ethanol, water and 15 N aqueous ammonia were blended at a ratio of 47:198:35:1.3 parts, which was stirred for 1 minute to obtain a sol which was cast into a container and allowed to stand at room temperature for 1 day to obtain a gel. The resultant gel was placed into the same pressure container as that in Example 5, the surroundings were filled with ethanol, and hydrophobilizing treatment was performed in the supercritical fluid as in Example 5 to obtain a sample. The resultant sample was a monolithic body (plate-like) having the thickness of 10 mm.

Bulk density before and after a humidity test as well as heat conductivity and light transmittance of the respective samples obtained in Examples 5 to 7 and Comparative Examples 4 to 5 were measured and a yield of the preparation step was evaluated in a case where the sample of obtained in the form of the monolithic body (plate-like). The results are shown in Table 2.

The conditions for evaluating various performances are as follows:

A humidity test was performed by allowing an aerogel to stand at a temperature of 60° C. and relative humidity of 90% for 48 hours. As regards heat conductivity, heat conductivity at 20 to 40° C. was measured using a heat conductivity measuring apparatus (manufactured by Eikoseiki K.K.) based on ASTM-C518. Light transmittance was obtained by measuring illuminance using an illuminometer (illuminometer manufactured by Yokogawa Instruments K.K., Model 510-02) and using a fluorescent lamp as a light source in an acrylic box before and after a sample was mounted. As regards yield evaluation, the appearances of the sample (craze, crack and the like) were visually observed and the sample having no perceivable craze and crack was regarded as a non-defective and a proportion of non-defectives was adopted as a yield at a sample preparation step.

The results of the measurement are shown in Table 2.

TABLE 2

| | Raw of Silica | Method of pH-control | Shape of Aerogel | Water Washing | Hydrophobic Agent | Dispersion Medium of Supercritical Drying | Supercritical Condition | Yield of Aerogel (%) | Bulk Density (g/cc) Before Humidity Test | Bulk Density (g/cc) After Humidity Test | Light Transmittance (%) | Heat Conductivity (W/mK) |
|---|---|---|---|---|---|---|---|---|---|---|---|---|
| EXAMPLE 5 | Sodium silicate | Sulfuric acid | Monolithic | Yes | Hexamethyldisilazane | Carbon dioxide | 80° C., 160 kg/cm$^2$ | 100 | 0.109 | 0.111 | 88 | 0.013 |
| EXAMPLE 6 | Sodium silicate | Sulfuric acid | Monolithic | Yes | Trimethylchlorosilane | Carbon dioxide | 80° C., 160 kg/cm$^2$ | 95 | 0.111 | 0.112 | 87 | 0.014 |
| EXAMPLE 7 | Silica-coloid Solution | Sulfuric acid | Monolithic | Yes | Hexamethyldisilazane | Carbon dioxide | 80° C., 160 kg/cm$^2$ | 100 | 0.105 | 0.106 | 86 | 0.014 |
| COMPARATIVE EXAMPLE 4 | Sodium silicate | Sulfuric acid | Monolithic | Yes | — | Carbon dioxide | 80° C., 160 kg/cm$^2$ | 95 | 0.108 | 0.408 | 84 | 0.013 |
| COMPARATIVE EXAMPLE 5 | Oligomer of Tetramethoxysilane | — | Monolithic | — | Hexamethyldisilazane | Carbon dioxide | 80° C., 160 kg/cm$^2$ | 75 | 0.110 | 0.111 | 92 | 0.012 |

From the results shown in Table 2, regarding the samples of Examples 5–7, it can be said that since little change in bulk density was observed before and after a humidity test, moisture adsorption was prevented and all of heat conductivity, light transmittance and yield were good. To the contrary, it is seen that, in Comparative Example 4 where hydrophobilizing treatment was not performed using the hydrophobilizing agent, bulk density was increased due to moisture adsorption by comparing the densities before and after a humidity test and, in Comparative Example 5 where alkoxysilane was used as a starting raw material, a yield is bad.

Examples 8

A water glass solution containing 10 parts by weight of an aqueous solution of sodium silicate ("J Sodium Silicate No. 3" manufactured by Nihon kagakukogyo K.K.: 29% by weight of silicon dioxide, 9.5% by weight of sodium oxide, pH 11) and 32 parts by weight of ion-exchanged water was passed through a column filled with styrene ion exchange resin ("Amberlite IR-120B" manufactured by Organo K.K.) to perform ion exchange. Upon this, a ratio of number of moles of sodium atoms in the water glass solution and number of exchangeable moles of ion exchange resin was 1:2. And pH of a hydrosol solution obtained by passing through the ion exchange resin was 3.

Next, 1 part by weight of 2.8 wt% aqueous ammonia was added to 200 parts by weight of this hydrosol solution to stir quickly. Such the addition of aqueous ammonia brought pH of the hydrosol solution into 6.

Next, 500 g of this hydrosol solution was added dropwise to 1500 g of silicone oil ("SH200 Oil" manufactured by Torey Dow Corning Silicone LTD.: viscosity 20CS (at 25° C.)) and stirring was continued for 5 minutes to perform suspension polymerization to obtain a hydrogel. The container used was a 2 liter tall beaker, the shape of an agitating blade was marine type having a diameter of 50 mm, and rotation rate was 1050 rpm. The resultant hydrogel was washed with water, and subsequently the hydrogel was washed with isopropanol to substitute water in the hydrogel with isopropanol.

Then, the gel was immersed into a solution of a hydrophobilizing agent obtained by dissolving hexamethyldisilazane (reagent manufactured by Torey Dow Corning Silicone LTD.) in isopropanol at the concentration of 1.2 mol/liter, followed by a reaction at 78° C. for 24 hours while stirring to hydrophobilization-treat the gel.

Thereafter, the hydrophobilization-treated gel was transferred to isopropanol and isopropanol was repeatedly exchanged while stirring to perform solvent substitution for 24 hours. Then, this gel was placed into liquefied carbon dioxide at 18° C. and 55 normal atmospheres to perform operations for substituting isopropanol in the gel with liquefied carbon dioxide for 3 hours. Then, the atmosphere was brought into a supercritical condition of carbon dioxide at 40° C. and 80 normal atmospheres, supercritical carbon dioxide was passed therethrough and pressure was reduced to atmospheric pressure to obtain a bead-like hydrophobic aerogel. A time required for supercritical drying was 10 hours.

Average particle size of the bead-like (particulate) aerogel thus obtained was measured. Separately, a hollow panel was prepared by arranging two transparent acrylic plates having the thickness of 1 mm at parallel via 12 mm interval and the bead-like aerogel obtained as described above was packed into this hollow panel. The packing rate was 70%. In addition, light transmittance and heat conductivity of the panel packed with the aerogel were measured. Light transmittance was obtained by measuring illuminance using an illuminometer (Model 510-02 manufactured by Yokogawa Instruments K.K.) and using a fluorescent lamp as a light source in an acrylic box before and after the panel packed with an aerogel was mounted. Heat conductivity was obtained by measuring heat conductivity at 20 to 40° C. using a heat conductivity measuring apparatus (manufactured by Eikoseiki K.K.) based on ASTM-C518.

Example 9

An aerogel was formed according to the same manner as that in Example 8 except that an amount of the ion exchange resin was set so that a ratio of number of moles of sodium atoms in a water glass solution relative to number of exchangeable moles of an ion exchange resin was 1:1, a bead-like (particulate) hydrophobic aerogel was obtained. Average particle size as well as light transmittance and heat conductivity of the bead-like aerogel were measured as in Example 8.

Example 10

An aerogel was formed according to the same manner as that in Example 8 except that silicone oil having viscosity of 10CS was used as a poor solvent upon suspension polymerization, a bead-like (particulate) hydrophobic aerogel was obtained. Average particle size as well as light transmittance and heat conductivity of a bead-like aerogel were measured as in Example 8.

Example 11

An aerogel was formed according to the same manner as that in Example 8 except that castor oil was used as a poor solvent upon suspension polymerization, a bead-like (particulate) hydrophobic aerogel was obtained. Average particle size as well as light transmittance and heat conductivity of the bead-like aerogel were measured as in Example 8.

Example 12

An aerogel was formed according to the same manner as that in Example 8, the hydrosol solution obtained by passing an aqueous solution of sodium silicate through an ion exchange resin was added dropwise to silicone oil as in Example 8, 2.8% by weight concentration of aqueous ammonia was added to this suspension of silicone oil and the hydrosol solution at a ratio of 1 part by weight relative to 200 parts by weight of the hydrosol solution while stirring for 5 minutes, to perform suspension polymerization. Under the same other conditions as those in Example 8, a bead-like (particulate) hydrophobic aerogel was obtained. Average particle size as well as light transmittance and heat conductivity of the bead-like aerogel were measured as in Example 8.

Example 13

An aerogel was formed according to the same manner as that in Example 8 except that sorbitan monooleic ester was previously added as a dispersant to silicone oil at a ratio of 10% by weight relative to silicone oil, a bead-like (particulate) hydrophobic aerogel was obtained. Average particle size as well as light transmittance and heat conductivity of the bead-like aerogel were measured as in Example 8.

Example 14

Using the gel which had not been subjected to hydrophobilizing treatment obtained in Example 8, this gel was placed into liquefied carbon dioxide at 18° C. and 55 normal atmospheres and operations for substituting isopropanol in the gel with carbon dioxide were performed for 3 hours. Next, the atmosphere was brought into a supercritical condition of carbon dioxide at 80° C. and 160 normal atmospheres. To this supercritical state atmosphere was added hexamethyldisilazane as a hydrophobilizing agent at a ratio of 0.25 moles/liter to diffuse the hydrophobilizing agent into the supercritical fluid over 2 hours, which was allowed to stand for 2 hours to perform hydrophobilizing treatment. Thereafter, supercritical drying was performed by bringing the atmosphere into a supercritical condition of carbon dioxide at 40° C. and 80 normal atmospheres, passing carbon dioxide at the supercritical state therethrough and reducing pressure to atmospheric pressure. A total time required for diffusion of the hydrophobilizing agent into the supercritical liquid, a reaction by allowing to stand, and subsequent supercritical drying by passing carbon dioxide therethrough was 6 hours. Average particle size as well as light transmittance and heat conductivity of the bead-like aerogel thus obtained were measured as in Example 8.

Example 15

According to the same manner as that in Example 8 except that a rotating rate of an agitating blade upon suspension polymerization was 1200 rpm, a bead-like (particulate) hydrophobic aerogel was obtained. Average particle size of this bead-like aerogel was measured as in Example 8. Separately, this bead-like aerogel and the bead-like aerogel obtained in Example 8 were mixed at an equal amount, and packed into a hollow panel as in Example 8. The packing rate was 75%. And, light transmittance and heat conductivity of the panel packed with this aerogel were measured.

Comparative Example 6

As in Example 8, the aerogel was hydrophobilizing-treated, and gradually dried at 25° C. for 48 hours without supercritically drying the gel to obtain a bead-like (particulate) hydrophobic xerogel. Average particle size as well as light transmittance and heat conductivity of the bead-like xerogel were measured as in Example 8.

Comparative Example 7

As in Example 8, the hydrogel was obtained by suspension polymerization and supercritically dried without hydrophobilizing treatment to obtain a bead-like (particulate) aerogel. Average particle size as well as light transmittance and heat conductivity of the bead-like aerogel were measured as in Example 8.

The results of measurement of average particle size, light transmittance and heat conductivity of aerogels in Examples 8 to 15 and Comparative Examples 6 to 7 are shown in Table 3.

TABLE 3

|  | Average particle size (mm) | Light transmittance (%) | Heat conductivity (W/mk) |
| --- | --- | --- | --- |
| Ex. 8 | 2.5 | 85 | 0.019 |
| Ex. 9 | 2.6 | 83 | 0.020 |
| Ex. 10 | 3.1 | 80 | 0.020 |
| Ex. 11 | 2.5 | 84 | 0.019 |
| Ex. 12 | 2.4 | 78 | 0.020 |
| Ex. 13 | 2.3 | 75 | 0.020 |
| Ex. 14 | 2.5 | 86 | 0.019 |
| Ex. 15 | 1.2 | 82 | 0.019 |
| Comp. Ex. 6 | 1.1 | 40 | 0.350 |
| Comp. Ex. 7 | 2.5 | 84 | 0.019 |

As seen from Table 3, it is confirmed that excellent transparency was obtained by using a ratio of ion exchange of greater than 1:1 as compared with a case where the ratio of not greater than 1:1 was used and a case where sulfuric acid was used. Additionally, light transmittance and heat conductivity deteriorated in Comparative Example 6 where supercritical drying was not performed. In addition, it is confirmed that a bead size can be adjusted by varying stirring conditions upon suspension polymerization as shown in Examples 10 and 15.

Next, a humidity test was carried out by exposing beads-like aerogels obtained in Example 8 and Comparative Example 7 under high humidity atmosphere at 60° C. and 90% RH for 48 hours. The aerogels tested for the humidity were measured for their average particle size as well as light transmittance and heat conductivity as in Example 8. The results are shown in Table 4.

TABLE 4

|  | Average particle size (mm) | Light transmittance (%) | Heat conductivity (W/mk) |
| --- | --- | --- | --- |
| Ex. 8 | 2.5 | 84 | 0.019 |
| Comp. Ex. 7 | 1.0 | 35 | 0.380 |

As seen from Table 4, average particle size became smaller and light transmittance and heat conductivity were reduced due to moisture absorption in Comparative Example 7 where hydrophobilizing treatment was not performed whereas such a change with time was not observed in Example 8 where hydrophobilizing treatment was performed.

Example 16

An aerogel was formed according to the same manner as that in Example 9 except that ethanol was used in place of isopropanol and a supercritical condition of carbon dioxide was set at 80° C. and 160 normal atmospheres, a bead-like (particulate) hydrophobic aerogel was obtained. The packing rate of the resultant aerogel was measured as in Example 8 and found to be 65%. In addition, average particle size as well as light transmittance and heat conductivity were measured as in Example 8.

Example 17

An aerogel was formed according to the same manner as that in Example 11 except that ethanol was used in place of isopropanol and a supercritical condition of carbon dioxide was set at 80° C. and 160 normal atmospheres, a bead-like (particulate) hydrophobic aerogel was obtained. The packing rate of the resultant aerogel was measured as in Example 8 and found to be 65%. In addition, average particle size as well as light transmittance and heat conductivity were measured as in Example 8.

Example 18

An aerogel was formed according to the same manner as that in Example 15 except that dimethyldimethoxysilane was used in place of hexamethyldisilazane and a supercritical condition of carbon dioxide was set at 80° C. and 160 normal atmospheres, a bead-like (particulate) hydrophobic aerogel was obtained. The packing rate of the resultant aerogel was measured as in Example 8 and found to be 70%. In addition, average particle size as well as light transmittance and heat conductivity were measured as in Example 8.

Example 19

An aerogel was formed according to the same manner as that in Example 14 except that methyltrimethoxysilane was used in place of carbon dioxide as a dispersion medium at supercritical drying, a bead-like (particulate) hydrophobic aerogel was obtained. The packing rate of the resultant aerogel was measured as in Example 8 and found to be 65%. In addition, average particle size as well as light transmittance and heat conductivity were measured as in Example 8.

Example 20

In Example 8, aqueous ammonia was added to a hydrosol at pH 3 after ion exchange to obtain a hydrosol at pH 6, which was cast into a cylindrical container to obtain a hydrogel. The hydrogel was washed with water and then washed with isopropanol to replace water in the hydrogel with isopropanol. Thereafter, hydrophobilizing treatment and supercritical drying were performed according to the same manner as that in Example 1 except that a supercritical condition was set at 80° C. and 160 normal atmospheres, a hydrophobilized aerogel was obtained. The resultant sample was a monolithic body (plate-like) having the thickness of 10 mm and the diameter of 50 mm. Light transmittance and heat conductivity of this sample were measured as in Example 8.

Example 21

An aerogel was formed according to the same manner as that in Example 20 except that the hydrogel was subjected to the hydrophobilizing treatment and supercritical drying after the hydrogel had been cured in water at 80° C. for 24 hours, the monolithic body (plate-like) was obtained. Light transmittance and heat conductivity of this sample were measured as in Example 8.

Example 22

An aerogel was formed according to the same manner as that in example 8 except that an amount of the ion exchange resin was set so that a ratio of number of moles of sodium atoms in a water glass solution relative to number of exchangeable moles of an ion exchange was 2:1, a bead-like (particulate) hydrophobic aerogel was obtained.

The resultant aerogel was packed into a hollow panel as in Example 8 and the packing rate was found to be 65%. In addition, light transmittance and heat conductivity of the bead-like aerogel were measured as in Example 8.

Example 23

An aerogel was formed according to the same manner as that in example 8 except that a supercritical condition of carbon dioxide was set at 80° C. and 160 normal atmospheres, a bead-like (particulate) hydrophobic aerogel was obtained. The resultant aerogel was packed into a hollow panel as in example 8 and the packing rate was found to be 65%. In addition, average particle size as well as light transmittance and heat conductivity were measured as in Example 8. Further, average particle size as well as light transmittance and heat conductivity were also measured after the same humidity test as described above.

Example 24

By using the gel before hydrophobilization obtained in Example 8, isopropanol in the gel was substituted with carbon dioxide at 80° C. and 160 normal atmospheres for 3 hours. Hexamethyldisilazane as a hydrophobilizing agent was added to this supercritical state atmosphere at a rate of 0.25 mole/liter, and the hydrophobilizing agent was diffused into the supercritical fluid, which was allowed to stand over 2 hours to hydrophobilize the gel. Thereafter, carbon dioxide in the supercritical state was passed therethrough and pressure of the atmosphere was reduced to atmospheric pressure, to obtain a bead-like (particulate) aerogel. A total time required for diffusion of the hydrophobilizing agent into the supercritical fluid, a reaction by allowing to stand, and subsequent supercritical drying by passing carbon dioxide therethrough was 6 hours.

The resultant aerogel was packed into a hollow panel as in Example 8 and the packing rate was found to be 65%. In addition, average particle size as well as light transmittance and heat conductivity of the aerogel were measured as in Example 8. Further, average particle size as well as light transmittance and heat conductivity were also measured after the same humidity test as described above.

Example 25

A solution (A Solution) obtained by mixing an aqueous solution of sodium silicate and water at a rate of 10:16 parts was added dropwise to a 0.95 mol/L aqueous solution of sulfuric acid (B Solution) while stirring. At a time point where A Solution became 26 parts relative to 16 parts of B Solution, stirring was stopped, the resultant sol was added dropwise to the same silicone oil as that of Example 8 and the similar procedures afforded a bead-like hydrogel. Thereafter, the hydrophobilizing treatment was performed in liquid phase and the supercritical drying was performed as in Example 23 to obtain a bead-like (particulate) aerogel.

The resultant aerogel was packed into a hollow panel as in Example 8 and the packing rate was found to be 65%. In addition, average particle size as well as light transmittance and heat conductivity were measured. Further, average particle size as well as light transmittance and heat conductivity were also measured after the same humidity test as described above.

Example 26

The hydrogel obtained in Example 25 was hydrophobilization-treated using a supercritical fluid as a dispersion medium according to the same manner as that in Example 24, to obtain a bead-like (particulate) aerogel.

The resultant aerogel was packed into a hollow panel as in Example 8 and the packing rate was found to be 65%. In addition, average particle size as well as light transmittance and heat conductivity were measured. Further, average particle size as well as light transmittance and heat conductivity were also measured after the same humidity test as described above.

Comparative Example 8

An aerogel was formed according to the same manner as that in Example 23 except that the hydrophobilizing treatment was not performed, a bead-like sample was obtained.

The resultant sample was packed into a hollow panel as in Example 8 and the packing rate was found to be 65%. In addition, average particle size as well as light transmittance and heat conductivity were measured. Further, average particle size as well as light transmittance and heat conductivity were also measured after the same humidity test as described above.

Comparative Example 9

An aerogel was formed according to the same manner as that in Example 25 except that the hydrophobilizing treatment was not performed, a bead-like sample was obtained.

The resultant sample was packed into a hollow panel as in Example 8 and the packing rate was found to be 65%. In addition, average particle size as well as light transmittance and heat conductivity were measured. Further, average particle size as well as light transmittance and heat conductivity were also measured after the same humidity test as described above.

Preparing conditions in Examples 16 to 26 and Comparative Examples 8 to 9 and the results of the measurement of average particle size as well as light transmittance and heat conductivity are shown in Table 5.

TABLE 5

| | Raw of Silica | Method of pH-control | Ratio of Sol: Resin | Gelation | Shape of Aerogel | Poor Solvent | Rotation Number (rpm) | Organic Solvent | Hydrophobilization | Hydrophobilizing Agent | Dispersion Medium | Supercritical Condition | Panel Packing Rate | Bead diameter (mm) | Light Transmittance (%) | Heat Conductivity (W/mK) |
|---|---|---|---|---|---|---|---|---|---|---|---|---|---|---|---|---|
| EXAMPLE 16 | J3 Sodium silicate | Ion exchange | 1:1 | Ammonia | Bead | Silicone Oil 20 cs | 1050 | Ethanol | Liquid Phase | Hexamethyldisilazane | Carbon dioxide | 80° C., 160 kg/cm² | 65 | 2.6 | 83 | 0.20 |
| EXAMPLE 17 | J3 Sodium silicate | Ion exchange | 1:2 | Ammonia | Bead | Castor Oil | 1050 | Ethanol | Liquid Phase | Hexamethyldisilazane | Carbon dioxide | 80° C., 160 kg/cm² | 65 | 2.5 | 84 | 0.019 |
| EXAMPLE 18 | J3 Sodium silicate | Ion exchange | 1:2 | Ammonia | Bead | Silicone Oil 20 cs | 1200 | IPA | Liquid Phase | Dimethyldimethoxysilane | Carbon dioxide | 80° C., 160 kg/cm² | 70 | 1.2 | 81 | 0.019 |
| EXAMPLE 19 | J3 Sodium silicate | Ion exchange | 1:2 | Ammonia | Bead | Silicone Oil 20 cs | 1050 | IPA | Supercritical | Methyltrimethoxysilane | Carbon dioxide | 80° C., 160 kg/cm² | 65 | 2.5 | 87 | 0.019 |
| EXAMPLE 20 | J3 Sodium silicate | Ion exchange | 1:2 | Ammonia | Plate-like | — | — | IPA | Liquid Phase | Hexamethyldisilazane | Carbon dioxide | 80° C., 160 kg/cm² | — | — | 90 | 0.013 |
| EXAMPLE 21 | J3 Sodium silicate | Ion exchange | 1:2 | Ammonia | Plate-like | — | — | IPA | Liquid Phase | Hexamethyldisilazane | Carbon dioxide | 80° C., 160 kg/cm² | — | — | 91 | 0.013 |
| EXAMPLE 22 | J3 Sodium silicate | Ion exchange | 2:1 | Ammonia | Bead | Silicone Oil | 1050 | IPA | Liquid Phase | Hexamethyldisila- | | 80° C., 160 kg/cm² | 65 | 2.5 | 65 | 0.021 |

TABLE 5-continued

| | Raw of Silica | Method of pH-control | Ratio of Sol:Resin | Gelation | Shape of Aerogel | Poor Solvent | Rotation Number (rpm) | Organic Solvent | Hydrophobilization | Hydrophobilizing Agent | Dispersion Medium | Supercritical Condition | Panel Packing Rate | Bead diameter (mm) | Light Transmittance (%) | Heat Conductivity (W/mK) |
|---|---|---|---|---|---|---|---|---|---|---|---|---|---|---|---|---|
| EXAMPLE 23 | J3 Sodium silicate | Ion exchange | 1:2 | Ammonia | Bead | Silicone Oil 20 cs | 1050 | IPA | Liquid Phase | Hexamethyldisilazane | Carbon dioxide | 80° C., 160 kg/cm² | 65 | 2.5 | 86 | 0.019 |
| EXAMPLE 24 | J3 Sodium silicate | Ion exchange | 1:2 | Ammonia | Bead | Silicone Oil 20 cs | 1050 | IPA | Supercritical | Hexamethyldisilazane | Carbon dioxide | 80° C., 160 kg/cm² | 65 | 2.5 | 87 | 0.019 |
| EXAMPLE 25 | J3 Sodium silicate | Sulfuric acid | — | — | Bead | Silicone Oil 20 cs | 1050 | IPA | Liquid Phase | Hexamethyldisilazane | Carbon dioxide | 80° C., 160 kg/cm² | 65 | 2.5 | 58 | 0.021 |
| EXAMPLE 26 | J3 Sodium silicate | Sulfuric acid | — | Ammonia | Bead | Silicone Oil 20 cs | 1050 | IPA | Supercritical | Hexamethyldisilazane | Carbon dioxide | 80° C., 160 kg/cm² | 65 | 2.5 | 59 | 0.020 |
| COMPARATIVE EXAMPLE 8 | J3 Sodium silicate | Ion exchange | 1:2 | — | Bead | Silicone Oil 20 cs | 1050 | IPA | — | — | Carbon dioxide | 80° C., 160 kg/cm² | 65 | 2.5 | 85 | 0.019 |
| COMPARATIVE EXAMPLE 9 | J3 Sodium silicate | Sulfuric acid | — | — | Bead | Silicone Oil 20 cs | 1050 | IPA | — | — | Carbon dioxide | 80° C., 160 kg/cm² | 65 | 2.5 | 57 | 0.020 |
| EXAMPLE 23 After Humidity test | | | | | | | | | | | | | | 2.5 | 86 | 0.019 |
| EXAMPLE 24 After Humidity test | | | | | | | | | | | | | | 2.5 | 87 | 0.019 |
| EXAMPLE 25 After humidity test | | | | | | | | | | | | | | 2.5 | 57 | 0.021 |
| EXAMPLE 26 After Humidity test | | | | | | | | | | | | | | 2.5 | 58 | 0.020 |
| COMPARATIVE EXAMPLE 8 After humidity test | | | | | | | | | | | | | | 1.0 | 36 | 0.380 |
| COMPARATIVE EXAMPLE 9 After humidity test | | | | | | | | | | | | | | 1.1 | 35 | 0.382 |

From Table 5, it is seen that the samples of Examples are superior over those of Comparative Examples, as also described for Table 3.

What is claimed is:

1. A process for producing a transparent aerogel, comprising the steps of
   a) lowering a pH value of a water glass solution to obtain a sol as a hydrosol, wherein lowering the pH value is performed by:
      ion exchanging the water glass solution with an ion exchange resin, wherein the ion exchange resin has a ratio of ion-exchangeable hydrogen atoms to a number of moles of alkali metals in the water glass solution (Resin:Sol) of greater or equal to about 1 (Resin:Sol>1 or Resin:Sol=1);
   b) gelling the sol to obtain a gel as a hydrogel, wherein gelling is performed by suspension polymerizing the sol by adding the sol dropwise to a poor solvent which does not dissolve the gel, and stirring the poor solvent;
   c) replacing water in the gel with an organic solvent;
   d) reacting the gel with a hydrophobilizing agent, wherein the hydrophobilizing agent has hydrophobic groups as well as functional groups reactive with liquid phase silanol groups; and
   e) drying the gel under supercritical conditions.

2. The process for producing an aerogel according to claim 1, wherein the poor solvent is selected from the group consisting of silicone oil, xylene, benzene, toluene, cyclohexane and castor oil.

3. The process for producing an aerogel according to claim 1, further comprising:
   neutralizing the sol by adding a basic substance to the sol after ion exchanging.

4. The process for producing an aerogel according to claim 1, wherein a basic substance is added to the poor solvent.

5. The process for producing an aerogel according to claim 4, wherein the basic substance is selected from the group consisting of ammonia, pyridine, hydrazine and piperidine.

6. The process for producing an aerogel according to claim 3, wherein the basic substance is selected from the group consisting of ammonia, pyridine, hydrazine and piperidine.

7. The process for producing an aerogel according to claim 1, wherein Resin:Sol is about 1 to about 2.

8. The process according to claim 1, wherein Resin:Sol is about 3.

9. The process according to claim 1, wherein the hydrophobilizing agent is one or more selected from the group consisting of organosilane compounds, hexamethyldisiloxane, hexamethyldisilazane, trimethylchlorosilane, trimethylmethoxysilane, trimethylethoxysilane, triethylethoxysilane, triethylemethoxysilane, dimethyldichlorosilane, dimethyldiethoxysilane, methyltrichlorosilane, ethyltrichlorosilane, carboxylic acids, acetic acid, formic acid, succinic acid, alkyl halides and methyl chloride.

10. The process for producing an aerogel according to claim 1, wherein a dispersant for the hydrosol is added to the poor solvent.

11. The process according to claim 10, wherein the dispersant for the hydrosol is a polyvalent alcohol fatty acid ester.

12. A process for producing a transparent aerogel, comprising the steps of:
   a) lowering a pH value of a water glass solution to obtain a sol as a hydrosol, wherein lowering the pH value is performed by:
      ion exchanging the water glass solution with an ion exchange resin, wherein the ion exchange resin has a ratio of ion-exchangeable hydrogen atoms to a number of moles of alkali metals in the water glass solution (Resin:Sol) of greater or equal to about 1 (Resin:Sol>1 or Resin:Sol=1), and neutralizing the sol by adding a basic substance to the sol after ion exchanging;
   b) gelling the sol to obtain a gel as a hydrogel; and
   c) simultaneously performing the steps of:
      reacting the gel with a hydrophobilizing agent, wherein the hydrophobilizing agent has hydrophobic groups as well as functional groups reactive with liquid phase silanol groups; and drying the gel under supercritical conditions, wherein a supercritical fluid is used as a dispersion medium.

13. The process according to claim 12, wherein the dispersion medium is one or a mixture selected from the group consisting of ethanol, methanol, propanol, isopropanol, butanol, dichlorodifluoromethane, carbon dioxide and water.

14. A process for producing a transparent aerogel, comprising the steps of:
   a) lowering a pH value of a water glass solution to obtain a sol as a hydrosol, wherein lowering the pH value is performed by:
      ion exchanging the water glass solution with an ion exchange resin, wherein the ion exchange resin has a ratio of ion-exchangeable hydrogen atoms to a number of moles of alkali metals in the water glass solution (Resin:Sol) of greater or equal to about 1 (Resin:Sol>1 or Resin:Sol=1);
   b) gelling the sol to obtain a gel as a hydrogel, wherein gelling is performed by suspension polymerizing the sol by adding the sol dropwise to a poor solvent which does not dissolve the gel, and stirring the poor solvent; and
   c) simultaneously performing the steps of:
      reacting the gel with a hydrophobilizing agent, wherein the hydrophobilizing agent has hydrophobic groups as well as functional groups reactive with liquid phase silanol groups; and drying the gel under supercritical conditions, wherein a supercritical fluid is used as a dispersion medium.

15. The process for producing an aerogel according to claim 14, wherein the poor solvent is selected from the group consisting of silicone oil, xylene, benzene, toluene, cyclohexane and castor oil.

16. The process for producing an aerogel according to claim 14, wherein a basic substance is added to the poor solvent.

17. The process according to claim 14, wherein the dispersion medium is one or a mixture selected from the group consisting of ethanol, methanol, propanol, isopropanol, butanol, dichlorodifluoromethane, carbon dioxide and water.

18. The process for producing an aerogel according to claim 14, wherein a dispersant for the hydrosol is added to the poor solvent.

19. The process for producing an aerogel according to claim 16, wherein the basic substance is selected from the group consisting of ammonia, pyridine, hydrazine and piperidine.

20. The process according to claim 15, wherein Resin:Sol is about 3.

21. The process according to claim 14, wherein the hydrophobilizing agent is one or more selected from the group consisting of organosilane compounds, hexamethyldisiloxane, hexamethyldisilazane, trimethylchlorosilane, trimethylmethoxysilane, trimethylethoxysilane, triethylethoxysilane, triethylemethoxysilane, dimethyldichlorosilane, dimethyldiethoxysilane, methyltrichlorosilane, ethyltrichlorosilane, carboxylic acids, acetic acid, formic acid, succinic acid, alkyl halides and methyl chloride.

22. The process according to claim 14, wherein Resin:Sol is from about 1 to about 2.

23. The process according to claim 14, wherein Resin:Sol is about 3.

* * * * *